United States Patent [19]
Shiokama et al.

[11] Patent Number: 5,438,387
[45] Date of Patent: Aug. 1, 1995

[54] AUTOMATIC FOCUSING CAMERA WITH CONTROL OF FOCUSING OPTICAL SYSTEM POSITION AND DRIVING POWER SOURCE VELOCITY

[75] Inventors: Yoshiharu Shiokama, Chiba; Shozo Yamano, Tokyo, both of Japan

[73] Assignee: Nikon Corporation, Tokyo, Japan

[21] Appl. No.: 278,862

[22] Filed: Jul. 14, 1994

Related U.S. Application Data

[60] Continuation of Ser. No. 58,307, May 10, 1993, abandoned, which is a division of Ser. No. 782,297, Oct. 24, 1991, Pat. No. 5,250,976.

[30] Foreign Application Priority Data

Oct. 30, 1990 [JP] Japan .................................. 2-290904
Dec. 25, 1990 [JP] Japan .................................. 2-414275

[51] Int. Cl.⁶ .............................................. G03B 13/36
[52] U.S. Cl. ................................................... 354/402
[58] Field of Search ....................... 354/400, 402, 195.1

[56] References Cited
U.S. PATENT DOCUMENTS
4,496,229  1/1985  Ogasawara .......................... 354/400
4,737,812  4/1988  Hasegawa et al. .................. 354/400

Primary Examiner—W. B. Perkey
Attorney, Agent, or Firm—Shapiro & Shapiro

[57] ABSTRACT

An automatic focusing camera system has a lens barrel with a focusing optical system, and a camera body. A focus detecting device in the camera body outputs a focus detecting signal. A calculating device in the camera body calculates driving information of the focusing optical system based upon the focus detecting signal. A driving device in the lens barrel has a driving power source and a transmission member for transmitting driving power to the focusing optical system to drive it based upon the driving information. First and second signal generators in the lens barrel, at respective final and initial stages of the transmission member, generate first and second driving signals in response to driving of the focusing optical system. A driving control device in the lens barrel controls position of the focusing optical system based upon the first driving signal and the driving information, and controls velocity of the driving power source based upon the second driving signal.

3 Claims, 10 Drawing Sheets

AUTOMATIC FOCUSING CAMERA WITH CONTROL OF FOCUSING OPTICAL SYSTEM POSITION AND DRIVING POWER SOURCE VELOCITY

This is a continuation of application Ser. No. 08/058,307 filed May 10, 1993, now abandoned, which is a division of application Ser. No. 07/782,297 filed Oct. 24, 1991, now U.S. Pat. No. 5,250,976, issued Oct. 5, 1993.

BACKGROUND OF THE INVENTION

1. Field of the Invention

The present invention relates to an automatic focusing camera. More particularly, the invention relates to a camera capable of performing a highly precise focusing by providing detecting means on the lens side for detecting the driving amount of a focusing optical system.

2. Related Background Art

Figure 12:
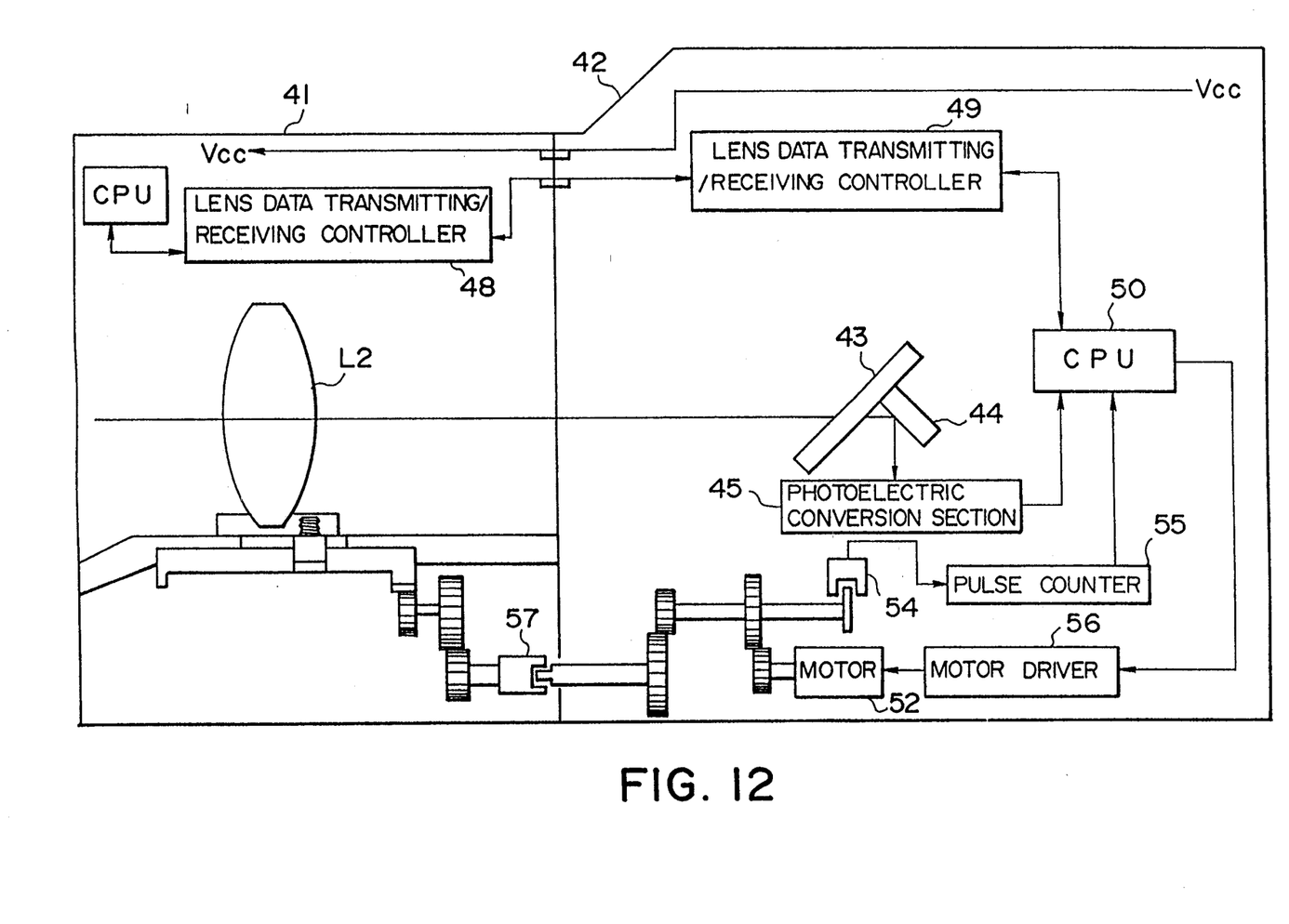
FIG. 12 is a schematic block diagram illustrating a conventional example of a camera system.

FIG. 12 illustrates an example of a conventional automatic focusing camera. In the camera shown in FIG. 12, an exchangeable photographing lens 41 is mounted on the body 42, and an objective image passing through the photographing lens 41 is detected by a photoelectric conversion section 45 through a main mirror 43 and a sub-mirror 44. The output from the photoelectric conversion section 45 is inputted into a focus detecting means through an A/D converter incorporated in a microcomputer (hereinafter referred to as CPU) 50 to obtain a defocus amount. In the meantime, lens data per se is inputted into the body side from the photographing lens 41 through lens data transmitting/receiving controllers 48 and 49 on the lens side and body side respectively, and a calculating means in the CPU 50 works out a required driving amount for a motor 52 on the basis of this lens data per se and the defocus amount obtained from the aforesaid detecting means. The data indicating the required driving amount is applied to one of the inputs of the coincidence detector in the CPU. To the other input of the aforesaid coincidence detector, signals corresponding to the driving amounts from a photointerrupter 54 provided in the body 42 and a pulse counter 55 are inputted in order to obtain the signal which corresponds to the driving amount of the motor 52. The coincidence detector compares this signal corresponding to the driving amount and the signal corresponding to the required driving amount obtained from the aforesaid calculating means. Thus, a signal corresponding to the difference between them is generated. The signal thus obtained is applied to the motor 52 through a motor driver 56. In this way, the motor 52 drives the focusing optical system L2 in the photographing lens 41 side through a coupling member 57 between the camera 42 and the lens 41 to perform focusing.

However, in the above-mentioned conventional camera, as the driving amount of the focusing optical system L2 is obtained by the pulse obtainable from the photointerrupter 54 mounted on the motor driving shaft, there have been encountered the problems given below.

(1) It takes a constant time before the defocus amount is obtained after the signal from the photoelectric conversion section 45 has been inputted into the focus detecting means. If a focus detection is performed while the focusing optical system L2 is being driven, the position of the focusing optical system L2 is dislocated from a position at which to begin obtaining the focus amount by a portion equivalent to such a constant time required for obtaining the defocus amount. Therefore, if the focusing optical system L2 is driven as it is from the result of the focus detection, the focusing optical system L2 cannot be stopped at a position where the focusing optical system has come into focus.

(2) Due to the mechanical gaps existing in the gears and others between the motor driving shaft in the camera body 42 side and the focusing optical system L2, the pulse numbers obtainable from the photointerrupter 54 do not coincide with the actual position of the focusing optical system L2 perfectly. Particularly, when driving pulses are output to reverse the driving direction, there are some cases where the focusing optical system L2 is not driven because of the backlashes of the gearing, coupling member 57, and the like. It is therefore necessary to use highly precise gearing and coupling member 57 for positioning the focusing optical system L2.

(3) When the focusing optical system L2 should be driven for a precise amount to be in focus in particular, it is preferable to drive the motor at a low speed for several pulses to enable the focusing optical system L2 to be positioned accurately.

SUMMARY OF THE INVENTION

Therefore, in consideration of the problems existing in a camera according to the conventional example set forth above, the objectives of the present inventions are:

(1) to provide an automatic focusing camera system wherein the position of the focusing optical system is known whenever the focusing optical system is being driven and the focusing optical system is driven to a focusing position by comparing the position of the focusing optical system in motion and the defocus amount;

(2) to provide an automatic focusing camera system capable of performing a highly precise focusing without being affected by the mechanical gaps existing between the motor driving shaft and the focusing optical system;

(3) to provide an automatic focusing camera system capable of driving the motor at a low speed particularly when the focusing optical system should be driven for a precise amount to be in focus; and (4) to provide as another objective a camera body capable of performing an optimal focusing for various types of photographing lenses in the case where any one of the various types of photographing lenses including photographing lenses of conventional constructions is mounted thereto.

According to the present invention, it is possible:

(1) to drive the motor at a low speed when the driving amount of the focusing optical system is small and to drive the motor at a high speed when the driving amount of the focusing optical system is large;

(2) to grasp the position of the focusing optical system accurately even when it is in motion by detecting the position of the focusing optical system;

(3) to grasp the position of the focusing optical system accurately because signal generating means is provided at the final stage to drive the focusing optical system; and (4) to enable also a photographing lens to be in focus by switching signals from signal generating means in the camera body even in a case where a conventional photographing lens, in which no signal generating means is incorporated, is mounted.

DESCRIPTION OF THE PREFERRED EMBODIMENTS

Figure 1:
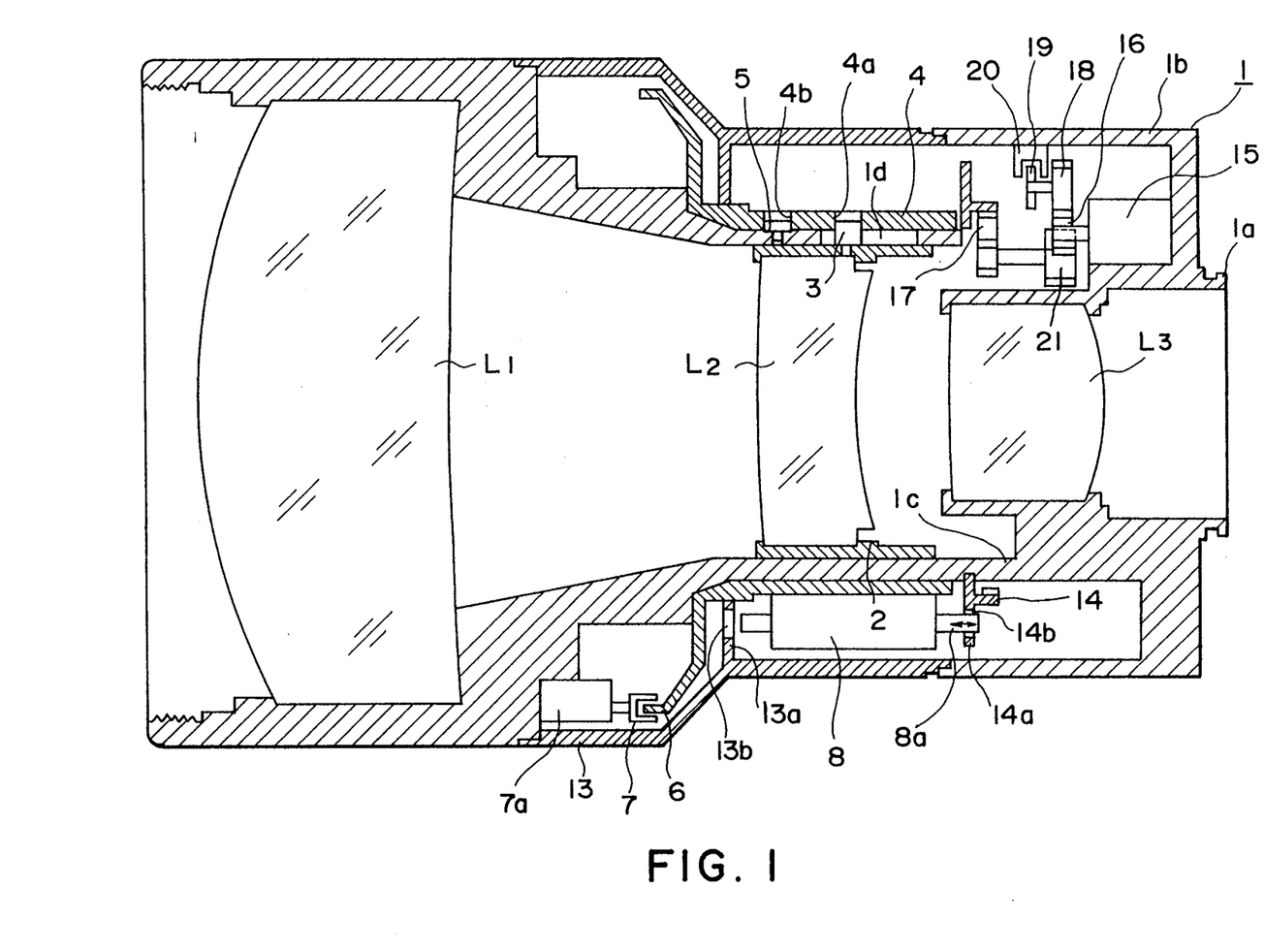
FIG. 1 is a cross-sectional view illustrating a lens barrel constituting a first embodiment.

FIG. 1 is a cross-sectional view illustrating a lens barrel of a first embodiment of a camera system according to the present invention.

The photographing system comprises three lens groups of L1, L2, and L3. The focusing optical system is designated by L2 and is supported by a supporting barrel 2.

The fixed barrel 1 is a member to fix the lens barrel to the camera body of the embodiment, and the lens barrel is mounted on the camera body by a bayonet nail 1a.

The fixed barrel 1 has its outer barrel 1b and inner barrel 1c, and to the inner periphery of the inner barrel 1c, the photographing systems L1 and L3 are fixingly supported while the focusing optical system L2 supported by the supporting barrel 2 is slidably supported thereon. In the fixed barrel, a pin 5 is planted. The supporting barrel 2 supports the focusing optical system L2 and fits in the fixed barrel 1.

In the supporting barrel 2, a pin 3 is planted.

The pin 3 fits in a linear guide groove 1d provided in the inner barrel 1c of the fixed barrel 1 and a lead groove 4a provided in a rotational barrel 4.

The rotational barrel 4 is rotatively fitted on the outer periphery of the inner barrel 1c of the fixed barrel 1. In the rotational barrel 4, the lead groove 4a and a circumferential groove 4b are cut.

The lead groove 4a is fitted for the pin 3 planted on the supporting barrel 2 for supporting the focusing optical system L2 while the circumferential groove 4b is fitted for the pin 5 planted on the fixed barrel 1, and by the pin 5 the movement in the optical axis is regulated and at the same time, the rotation around the optical axis is regulated with a predetermined angle.

At the end of the rotational barrel 4, a rotational section 6 is installed to rotate accompanying the rotation of the rotational barrel 4. The rotational section 6 is a rotational section 120 shown in FIG. 2 and FIG. 3 with a plurality of slits formed therein. The photointerrupter 7 comprises an index scale 123, light emitting section 121, and light receiving sections 122a, 122b shown in FIG. 2 and FIG. 3. In this respect, electrical parts and others are stored at 7a.

The pin 5 is planted on the fixed barrel 1 to fit into the circumferential groove 4b of the rotational barrel 4 to regulate the movement of the rotational barrel 4.

A solenoid 8 is of a bistable type and is planted on the outer periphery of the rotational barrel 4. Its axis 8a is provided movably forward and backward in the axial direction by electric signals from a switch (not shown).

A distance operation ring 13 is a barrel in order to perform focusing manually. In the distance operation ring 13, a projecting section 13a is provided on its inner side projectingly in front of the shaft 8a of the solenoid 8. Along its circumferential direction, a plurality of elongated holes 13b are provided coaxially with the shaft 8a to fit for the shaft 8a. These holes are arranged so that one of the elongated holes 13b is fitted for the shaft 8a when the shaft is at its front side position in a so-called manual focusing state and is not fitted for the shaft when it is at its rear side position.

A segment gear 14 is a driving force transmission member for the focusing by an automatic operation. In the segment gear 14, a projection section 14a is projectingly provided in the rear side of the shaft 8a of the solenoid 8. Along its circumferential direction, a plurality of elongated holes 14b are provided coaxially with the shaft 8a to fit for the shaft 8a. These holes are arranged so that one of the elongated holes 14b is fitted for the shaft 8a when the shaft is at its rear side position in a so-called automatic focusing state and is not fitted for the shaft when it is at its front side position.

The motor 15 is fixed to the fixed barrel 1 and its driving force is transmitted to the segment gear 14 through a gear 16, gear 21, and gear 17 which form a speed reduction gear train.

With the gear 16 mounted on the shaft of the motor 15, the gear 18 engages, and to the gear 18, a disc type rotational section 19 is fixed. On the rotational section 19, a plurality of slots are formed radially from its axial center. A photointerrupter 20 is the same as shown in the aforesaid FIG. 2.

Now, the operation of the photographing lens in the first embodiment will be described.

Figure 5:
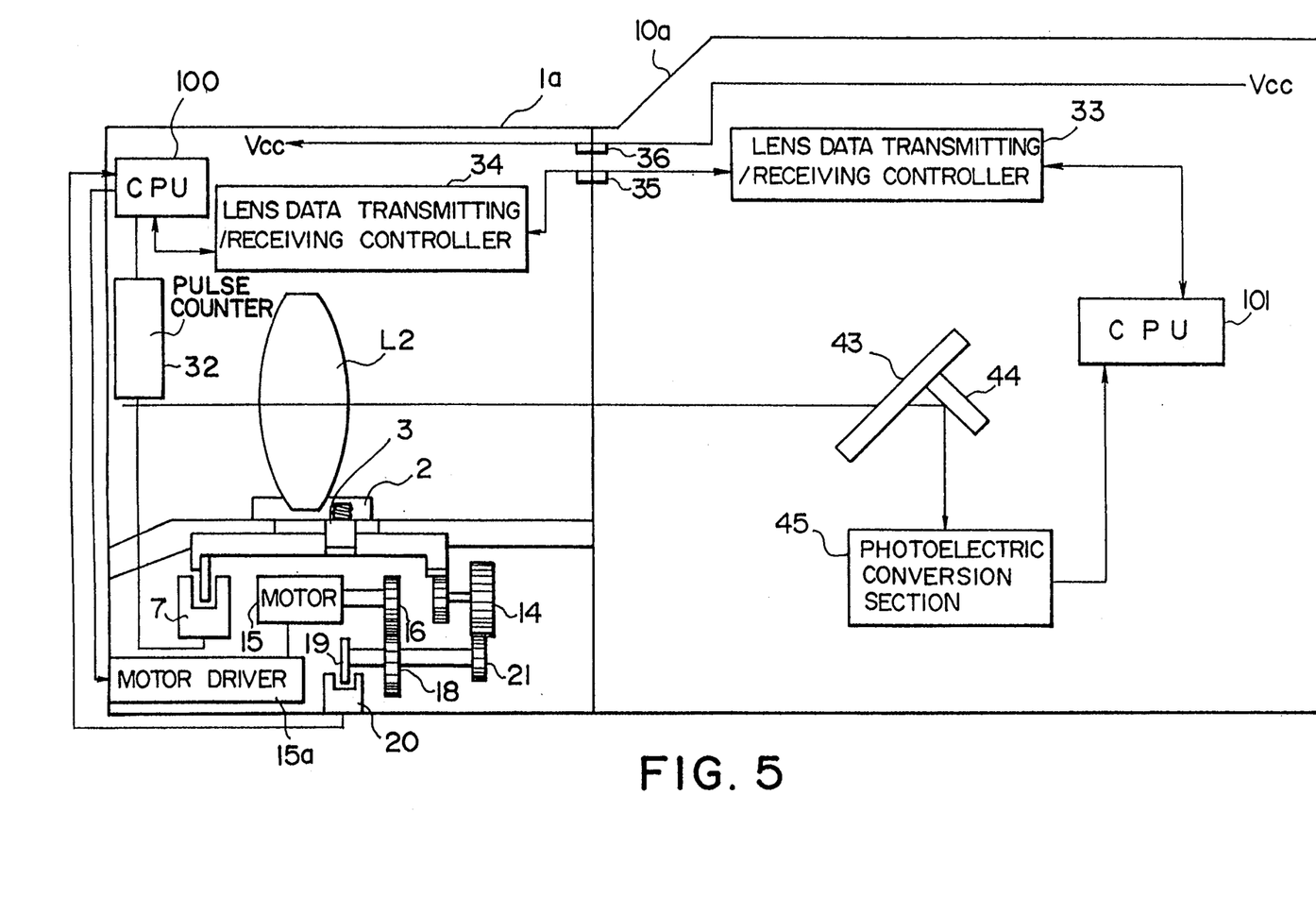
FIG. 5 is a schematic block diagram showing a camera system according to the first embodiment.

When the autofocusing mode for the automatic focusing operation is selected by changing a mode switch (not shown), this selection signal is inputted into a CPU 100 shown in FIG. 5. Then, this signal causes the motor 15 fixed to the fixed barrel 1 to be rotated through the CPU 100 and the motor driver 15a, and its driving force is transmitted to the segment gear 16 through the gear 14, gear 21 and gear 17 constituting the speed reduction gear train. Thus, one of the elongated holes 14b provided along the circumferential direction of the projection 14a of the segment gear 14 fits the shaft 8a of the solenoid 8 which is moved backwards by the AF mode switching.

As the solenoid 8 is fixingly provided on the outer peripheral side of the rotational barrel 4, the rotation of the motor 15 is transmitted to the rotational barrel 4 through the segment gear 14 to rotate the rotational barrel 4. When the rotational barrel 4 is rotated, the supporting barrel 2 is moved along the lead groove 4a in the direction of the optical axis, so that the focusing optical system L2 is driven in the direction of the optical axis to be in focus.

Now, by switching the mode switch to select the manual focusing mode for the manual focusing operation, the distance operation ring 13 can be operated manually. Then, one of the elongated holes 13b provided along the circumferential direction of the projection 13a of the distance operation ring 13 fits the shaft 8a of the solenoid 8 which has moved forwards by the switching to the manual focusing mode. As the solenoid 8 is fixingly provided on the outer peripheral side of the rotational barrel 4, the rotation of the distance operation ring 13 is transmitted to the rotational barrel 4 to rotate the rotational barrel 4. Thereafter, the focusing operation system L2 is driven in the direction of the optical axis to be in focus as in the case of the automatic focusing operation.

Figure 2:
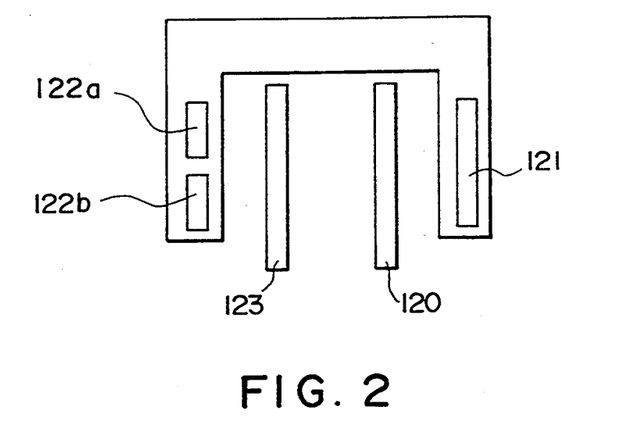
FIG. 2 and FIG. 3 are views illustrating schematically the structure of signal generating means.
Figure 3:
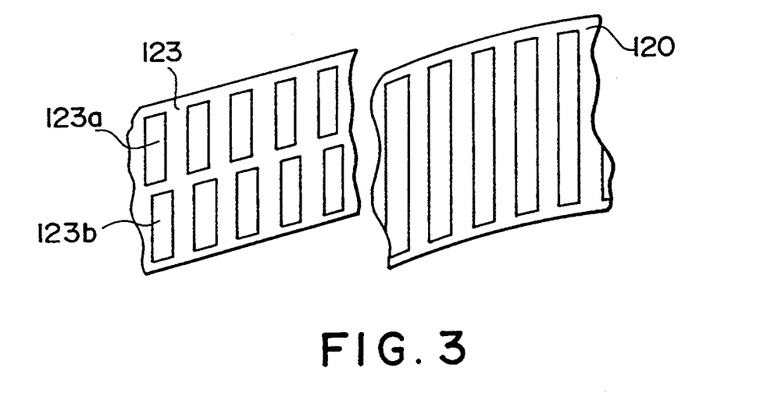

Subsequently, referring to FIG. 2, FIG. 3, and FIG. 4, the description will be made of the structures of the rotational section and photointerrupter which constitute signal generating means.

Sandwiching the rotational section 120 with a plurality of slits formed therein, which rotates accompanying the rotation of the rotational barrel 4, the light emitting section 121 and two light receiving sections 122a and 122b are arranged. Between the rotational section 120 and the two light receiving sections 122a and 122b, the index scale 123 is fixingly arranged. The index scale 123 comprises as shown in FIG. 3 slits 123a arranged in front of the light receiving section 122a and the slits 123b arranged in front of the light receiving section 122b, the phase of which is dislocated by a ¼ phase with respect to the slits 123a.

The reason why the index scale 123 is structured in this way is that not only the variable amount of the position of the focusing optical system L2 but the moving direction of the focusing optical system L2 can also be detected.

Light emitted from the light emitting section 121 reaches the light receiving section 122a whenever the slits of the rotational section 120 and the slits 123a of the index scale are in the relationship of overlapping each other even slightly. An output waveform is output as shown in FIG. 4 (a-1), which is converted into a pulse signal as shown in FIG. 4 (a-2) by electrical processing. Likewise, light emitted from the light emitting section 121 reaches the light receiving section 122b whenever the slits of the rotational section 120 and the slits 123b of the index scale are in the relationship of overlapping each other even slightly. An output waveform is output as shown in FIG. 4 (b-1), which is converted into a pulse signal as shown in FIG. 4 (b-2) by electrical processing. The phase of the pulse signal generated in the light receiving section 122b is dislocated by a ¼ cycle as compared with that of the pulse signal generated in the light receiving section 122a. At this time, the rotational direction of the rotation of the rotational section 120 is detected on the basis of the output timings of the light receiving sections 122a and 122b, and using two signal lines the rotational direction is transmitted to the CPU 101 in the body together with the rotational extent of the rotational section 120. The synthesized pulse signals to be transmitted are such as shown in FIG. 4 (a-3) and FIG. 4 (b-3).

Figure 4:
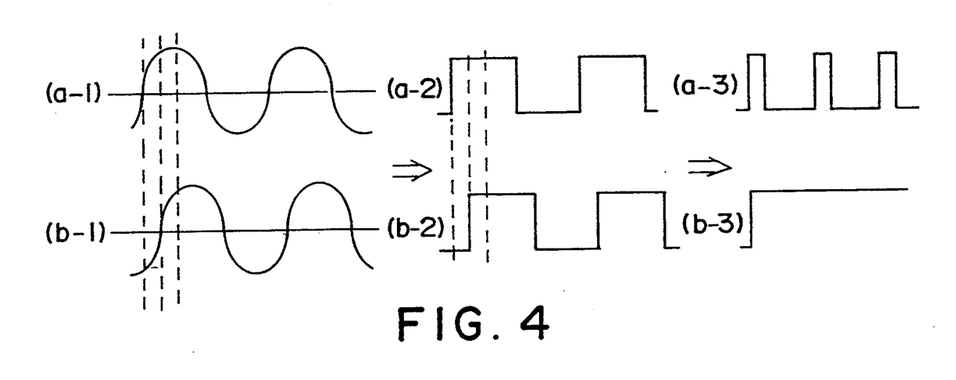
FIG. 4 a view illustrating the converting process of the output signals from a light receiving section.

Also, the structure may be arranged so as to output the two pulse signals shown in FIG. 4 (a-2) and FIG. 4 (b-2) to the two signal lines.

Now, the description will be made of a camera system according to the first embodiment wherein an exchangeable photographing lens is mounted on the camera body.

FIG. 5 illustrates the fundamental structure of an automatic focusing camera system according to the first embodiment.

The camera body 10a has a semi-transparent mirror 43, total reflection sub-mirror 44, photoelectric conversion section 45, CPU 101, and lens data transmitting-/receiving controller 33.

Also, a lens data transmitting/receiving controller 34 is provided in the lens 1a in order to transmit or receive electric signals between the photographing lens 1a and camera body 10a, and the structure is arranged so that communications are possible through the lens contact 35. Also, the source power $V_{cc}$ for operating a CPU 100, lens data transmitting/receiving controller 34, and others is supplied from the camera body 10a side through the lens contact 36.

The light beam from an object reaches the main mirror 43 of the camera body 10a through the photographing lens 1a, and a part of the light beam which has passed the main mirror 43 is reflected by the sub-mirror 44 to be induced into the photoelectric conversion section 45. The photoconversion section 45 is a line sensor comprising a semiconductor CCD element, for example.

The output signal from this photoelectric conversion section 45 is inputted into the CPU 101 in the camera body. In the CPU 101, the output signal is converted from analog signal to digital signal by the A/D converter and is inputted into the focus detecting means (not shown).

In this respect, while a focus detecting method of the so-called passive type is illustrated in FIG. 5 and FIG. 7 to FIG. 10, it may be possible to employ a detecting method of the active method for the purpose.

The aforesaid focus detecting means obtains a defocus amount by the known technique. The calculating means receives through the lens data transmitting-/receiving controller 33 the lens data per se which has been transmitted from the lens 1 through the CPU 100 in the lens side and the lens data transmitting/receiving controller 34, and works out the pulse numbers corresponding to the required driving amount using this lens data per se and the aforesaid defocus amount. In other words, the lens data per se which has been transmitted from the lens side includes monitor pulse numbers P1ns per driving amount for a unit image area, for example. Therefore, given a defocus amount obtained by the aforesaid focus detecting means as Df, the driving pulse members required for focusing, i.e., the required driving pulse numbers N are obtained in the expression given below.

$$Df \times P1ns.$$

On the other hand, the photointerrupter 7 on the lens side outputs pulses in accordance with the driving of the supporting barrel 2, and the pulses are inputted into the pulse counter 32 in the photographing lens. The pulse counter 32 counts the pulses to input them into an input of the coincidence detecting means in the CPU 100. To the other input of the coincidence detecting means, the required driving pulse numbers N, which have been transmitted from the CPU 101 to the CPU 100, are inputted. The driving control means continues transmitting the driving signals to the motor driver 15a for driving in the focusing direction with respect to the detected defocus state until both of the inputted pulse numbers coincide. Hence, the motor 15 is driven, and the rotation of the aforesaid motor 15 is transmitted to the gears 14, 16, and 17, and others in the lens to drive the supporting barrel 2 in the direction of the optical axis. Then, at this juncture, the output pulse numbers from the photointerrupter 7 are inputted into the pulse counter 32 simultaneously.

In this way, the motor 15 is driven to move the focusing optical system L2, and when the required driving pulse numbers N obtained by the aforesaid calculating means and the output of the pulse counter 32 coincide, the coincidence detecting means detects this, and on the basis of this detection, the driving control means stops the driving signal transmission to the motor driver 15a to terminate the driving. Thus, the focusing is completed.

To drive the focusing optical system L2, the driving velocity should be controlled. In a case where the velocity control is performed by a known technique, it is necessary to provide a feedback signal for return. It may be possible to use the output pulse of the photointerrupter 7 as a feedback signal or a motor shaft photointerrupter 20 instead of the photointerrupter 7.

The perform the velocity control of the motor using the motor shaft photointerrupter 20 by detecting the position of the focusing optical system L2 by the photointerrupter 7 makes it possible to secure the precision for the positional detection of the focusing optical system L2 as well as to perform an accurate control because the rotational speed of the motor can be detected accurately.

Here, in this case, it may be possible to use a motor shaft photointerrupter 20 which is capable of detecting the rotational amount only. This is because the motor shaft photointerrupter 20 is only required to perform the velocity control, and it is unnecessary for this photointerrupter to detect the driving direction of the focus optical system L2.

Figure 6:
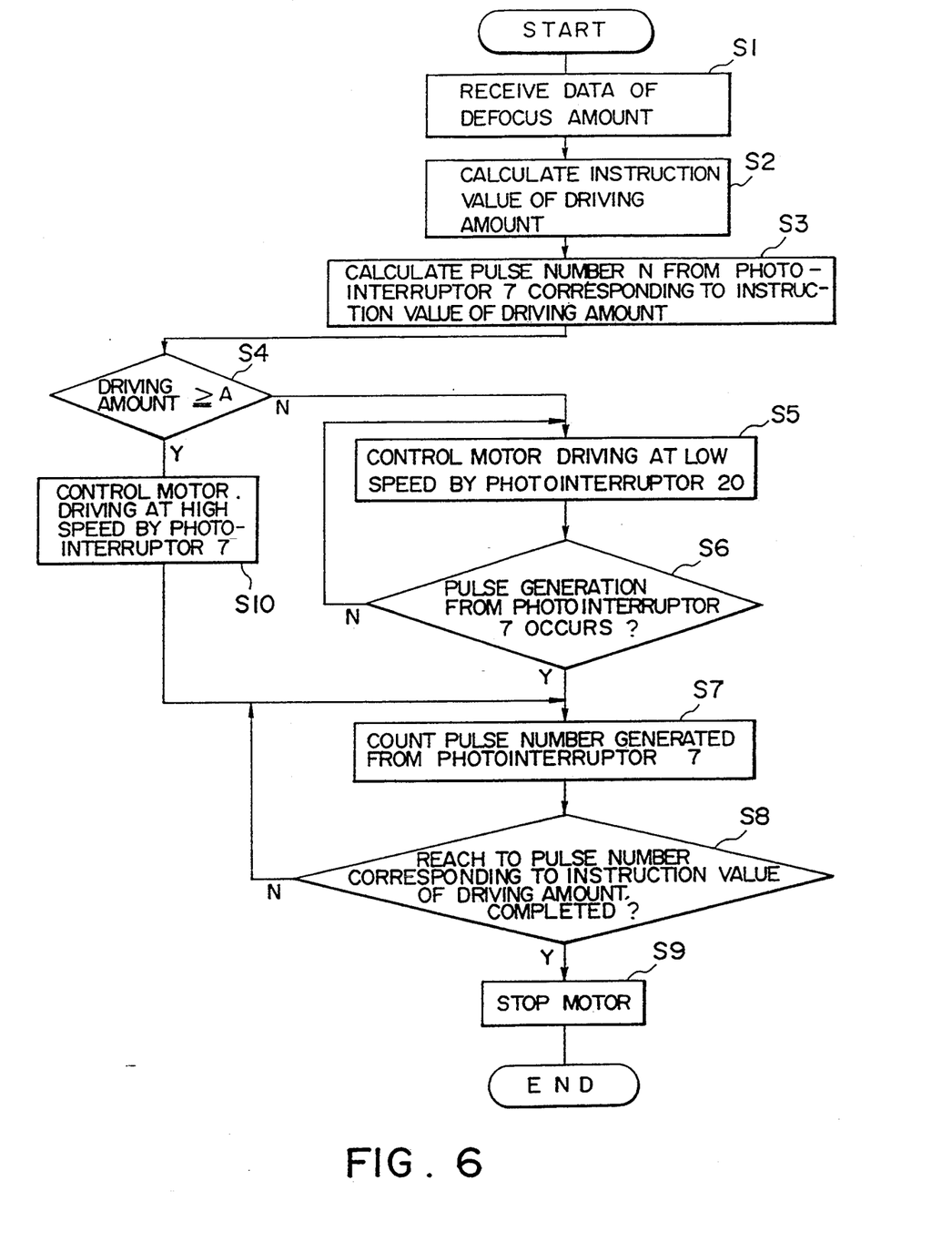
FIG. 6 is a flowchart illustrating the procedures for the position control and velocity control.

Now, using a flowchart shown in FIG. 6 the description will be made of the operations of the positional control and velocity control by the use of the photointerrupter 7 and the motor shaft photointerrupter 20.

In step S1, the data for the defocus amount is received from the focus detecting means and in the subsequent step S2, the lens driving amount for the focusing optical system L2 is calculated on the basis of this defocus amount. Further in step S3, when the focusing optical system L2 has been driven for the driving amount worked out in the above-mentioned step, the total number of the pulses generated by the photointerrupter, i.e., the pulse numbers N corresponding to the driving amount, is calculated. Subsequently, in step S4, whether the driving amount worked out in the step S2 exceeds a predetermined value A or not is discriminated, and if the amount exceeds the predetermined value A, then the process proceeds to step S10 or otherwise to step S5. This predetermined value A is a threshold value to be used for the selection of the photointerrupter 7 with respect to the driving amount of the focusing optical system L2 or the motor shaft photointerrupter 20.

In step S4, if the driving amount is discriminated to be less than the predetermined value A, i.e., the focusing optical system L2 should be driven finely, a low-speed instruction signal is given to the driving control means in step S5, and this low-speed instruction signal and the pulse signal from the motor shaft photointerrupter 20 are compared to perform a velocity feedback control so that the velocity of the motor 15 becomes identical to the velocity of the low-speed instruction. More specifically, the pulse intervals of the pulse signal from the motor shaft photointerrupter 20 are detected to perform the driving control by repeating the turn off and on of the motor 15 so as to define the time intervals to be identical to the pulse intervals of the low-speed instruction signal. At this juncture, due to the backlashes of the gears in the lens driving mechanism, the actuation of the focusing optical system L2 is delayed from the starting of the motor 15. In the subsequent step S6, whether the pulse for the photointerrupter 7 is generated or not is discriminated, and if the pulse is generated, the process proceeds to step S7 or otherwise, returns to the step S5 to continue the low-speed control of the motor 15 in accordance with the feedback signals from the photointerrupter 20.

If the photointerrupter 7 generates pulses, the pulses are counted in step S7, and the process advances to step S8. In the step S8, the coincidence detecting means examines whether or not the counting value Of the generated pulses by the photointerrupter 7 is a pulse number corresponding to the driving amount worked out in the step S3, and if the counting value is found to have reached the pulse number correspond to the driving amount, then the process proceeds to step S9 to stop the motor 15 through the driving control means or otherwise, returns to the step S7 to continue counting the pulse numbers.

If an affirmative result is obtained in step S4, then the motor 15 is actuated in step S10 to perform a high-speed driving control in accordance with the feedback pulse signal from the photointerrupter 7. At this juncture, due to the backlashes of the gears in the lens driving mechanism, the pulse generation of the photointerrupter 7 is lagged from the starting of the motor 15. Accordingly, there is a slight instability at the time to actuate the motor 15. However, as compared with the above-mentioned operation for the fine driving amount, this time lag is extremely small and is negligible.

With the completion of the above-mentioned processing, the execution of the program is terminated.

In order to eliminate any errors in the positional control of the focusing optical system L2 due to the backlashes in the lens driving mechanism such as mentioned above, the photointerrupter 7 which generates pulses in response to the driving amount of the focusing optical system L2 and the motor shaft photointerrupter 20 which generates pulses in response to the rotation of the motor are provided to control the velocity of the motor 15 at a low speed with the pulses generated by the motor shaft photointerrupter 20 before the pulses are generated by the photointerrupter 7 when the driving amount of the focusing optical system L2 is small and to count the pulses when the pulses are generated by the photointerrupter 7 for controlling the driving amount of the focusing optical system L2. Hence, the motor velocity is stabilized so as to stop the motor at an objective position accurately thereby to improve the precision of the focusing.

Figure 7:
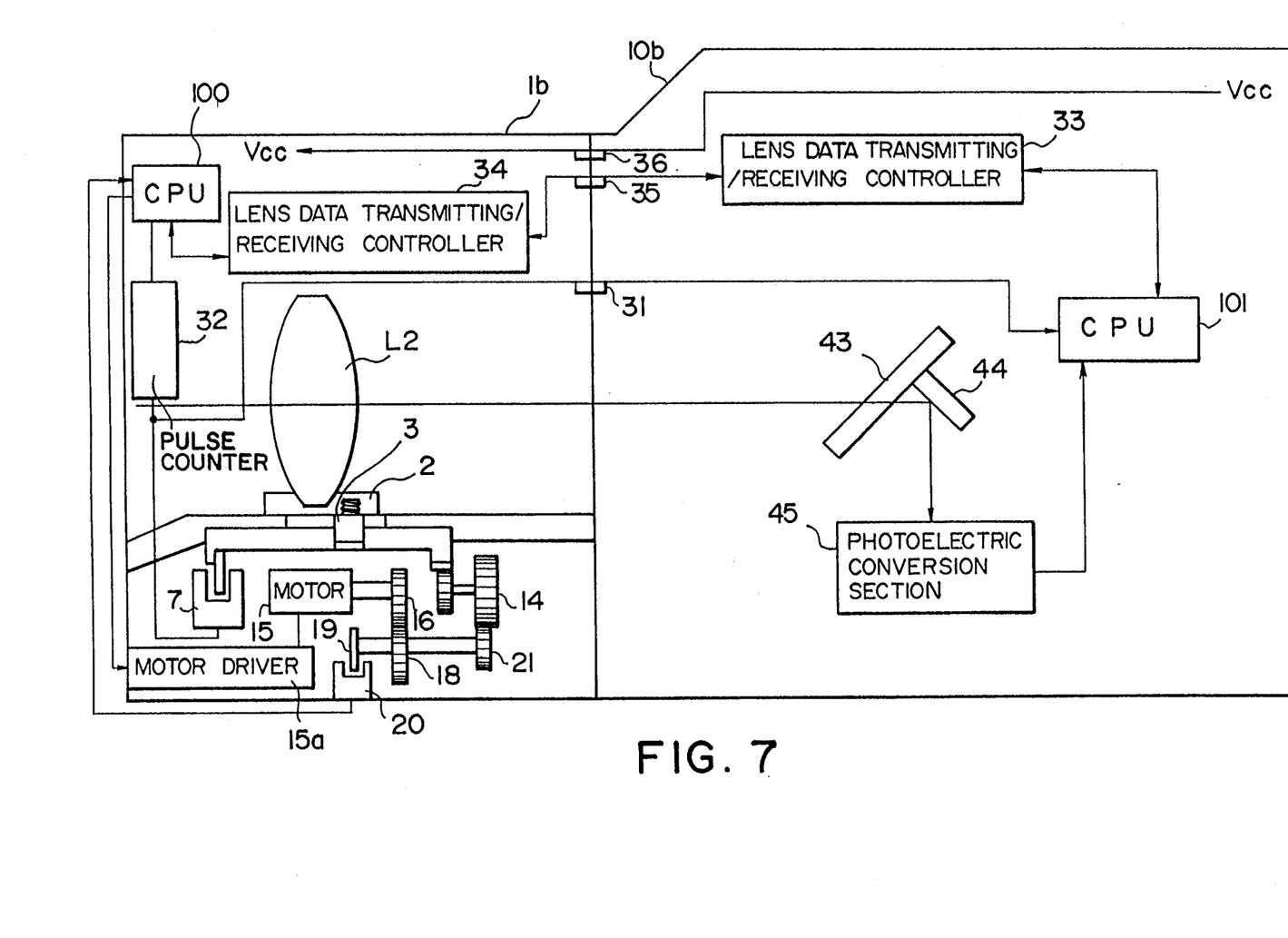
FIG. 7 is a schematic block diagram showing a second embodiment of the camera system.

A second embodiment shown in FIG. 7 is a camera system wherein an electric contact 31 is added to the photographing lens 1b and the camera body 10b of the first embodiment.

In other words, the camera system according to the second embodiment enables the output of the photointerrupter 7 to be transmitted to the CPU 101 in the camera body 10b on real time through the electric contact 31.

When a focus detecting is performed while the focusing optical system L2 is in motion, the focusing optical system L2 is in an advanced position by an amount ($\Delta N$) which is a portion equivalent to a time ($\Delta t$) from the start of photoelectric conversion in the photoelectric conversion section 45 to the completion of the defocus amount calculation.

Therefore, if the required driving pulse numbers N obtained as above are given to the motor 15 as they are, the result is that the focusing optical system L2 has eventually advanced from its proper focusing position by an amount ($\Delta N$).

Then, in the CPU 101 in the camera body side, the output pulses of the photointerrupter 7, which are being transmitted from the lens 1b through the electric contact 31, are counted to measure the driving amount ($\Delta N$) of the focusing optical system L2 on real time for the duration of a time ($\Delta t$). Therefore, the required driving pulse numbers N1 are obtainable by an equation given below.

$$N1 = N - \Delta N$$

To the motor the required driving pulse numbers N1 are given through the driving control means, and the amount of the focusing optical system L2 to be driven by this driving is inputted to the pulse counter 32, and then is inputted into the CPU 100 in the lens side. The coincidence detecting means in the CPU 100 detects the coincidence of the required driving pulse numbers N1 and the pulse numbers inputted into the pulse counter 32 thereby to stop the driving and terminate the focusing operation.

Hence, the output of the photointerrupter 7 is being transmitted to the calculating means on real time to make it possible to drive the focusing optical system L2 to an accurate focusing position even when the focusing optical system L2 is in motion.

Figure 8:
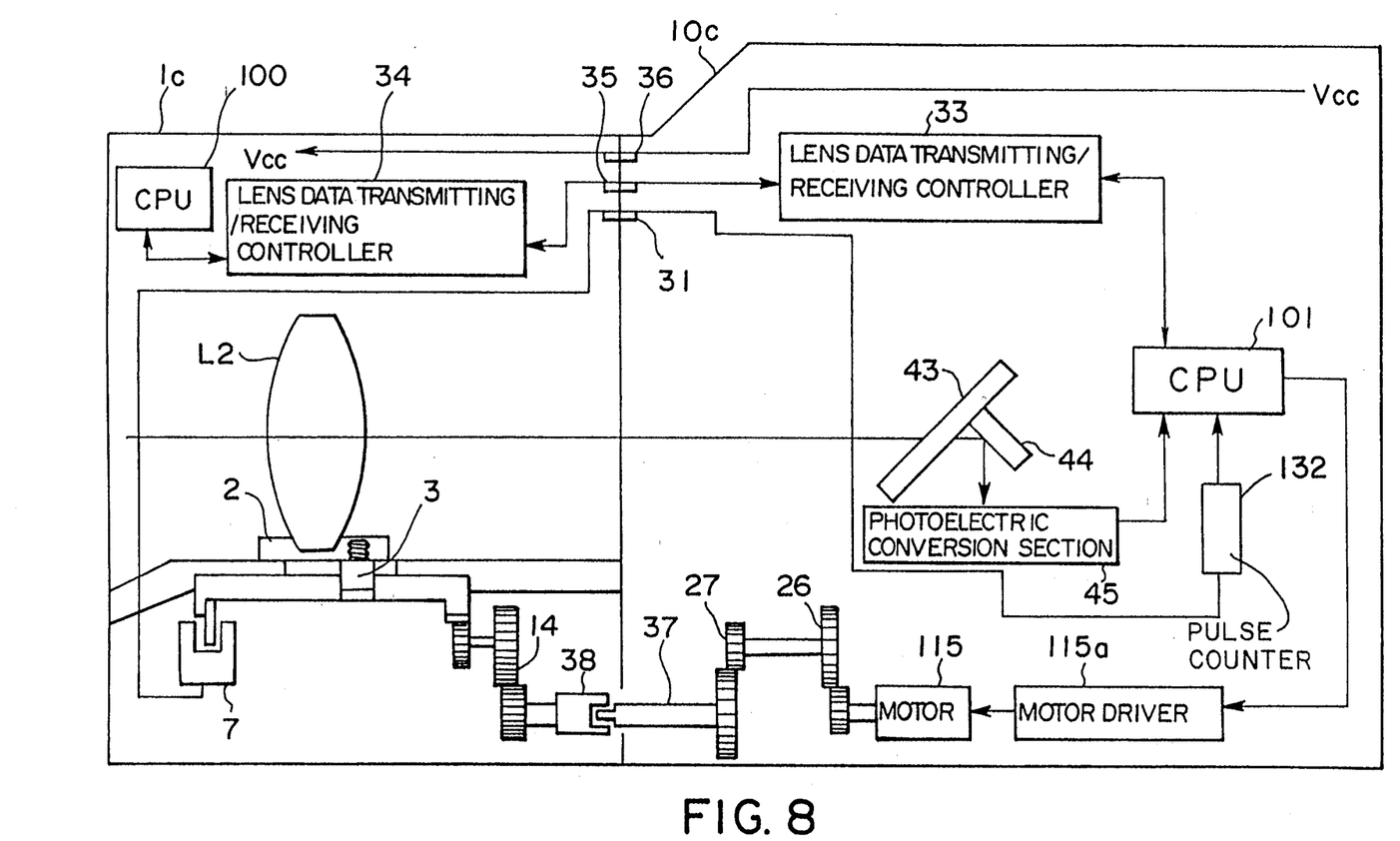
FIG. 8 is a schematic block diagram showing a third embodiment of the camera system.

Now, a camera system according to a third embodiment will be described.

FIG. 8 illustrates the fundamental structure of an automatic focusing camera system according to the third embodiment.

What differs in the present embodiment from the first or the second embodiment is that while a motor is incorporated in the camera body 10c, the coupling members 37 and 38 for transmitting the driving power of the motor are respectively arranged in the photographing lens 1c and camera body 10c.

As in the case of the first embodiment, the defocus amount of an object is obtained by the functions of the photoelectric conversion section 45 and focus detecting means. Also, the lens data per se is transmitted from the photographing lens side to enable the required driving pulse numbers N to be obtained for the driving of the motor 115. The driving control means transmits the pulse numbers N to the motor driver 115a to drive the motor 115 in the camera body. The motor 115 drives the gears in the camera body and coupling means 37 in the body side. As the coupling means 37 on the body side is coupled to a coupling means 38 on the lens side in the photographing lens, the driving power of the motor 115 is also transmitted to the gears and others in the photographing lens. Thus, the focusing optical system L2 is driven.

In the meantime, driving pulses are generated from the photointerrupter 7 in the photographing lens 1c as the focusing optical system L2 is being driven and are directly transmitted to the CPU 101 from the pulse counter 132 in the camera body 10c. Hence, these driving pulses are compared with the required driving pulse numbers by the coincidence detecting means in the CPU 101.

When the motor 115 in the camera body is used, not only the backlashes of the gears but the mechanical gap is generated in the coupling portion of both of the coupling means 37 and 38. Therefore, it is difficult for the conventional method to perform driving to obtain an accurate focusing position.

With the present embodiment, however, the driving of the focusing optical system L2 is detected at the rotational section 4 which drives the focusing optical system L2 finally, thus making possible the driving thereof to an accurate focusing position.

Furthermore, the output of the photointerrupter 7 is also transmitted to the camera body through the electric contact 31. Accordingly, it is possible to grasp the accurate position of the focusing optical system L2 even when the system L2 is in motion.

Figure 9:
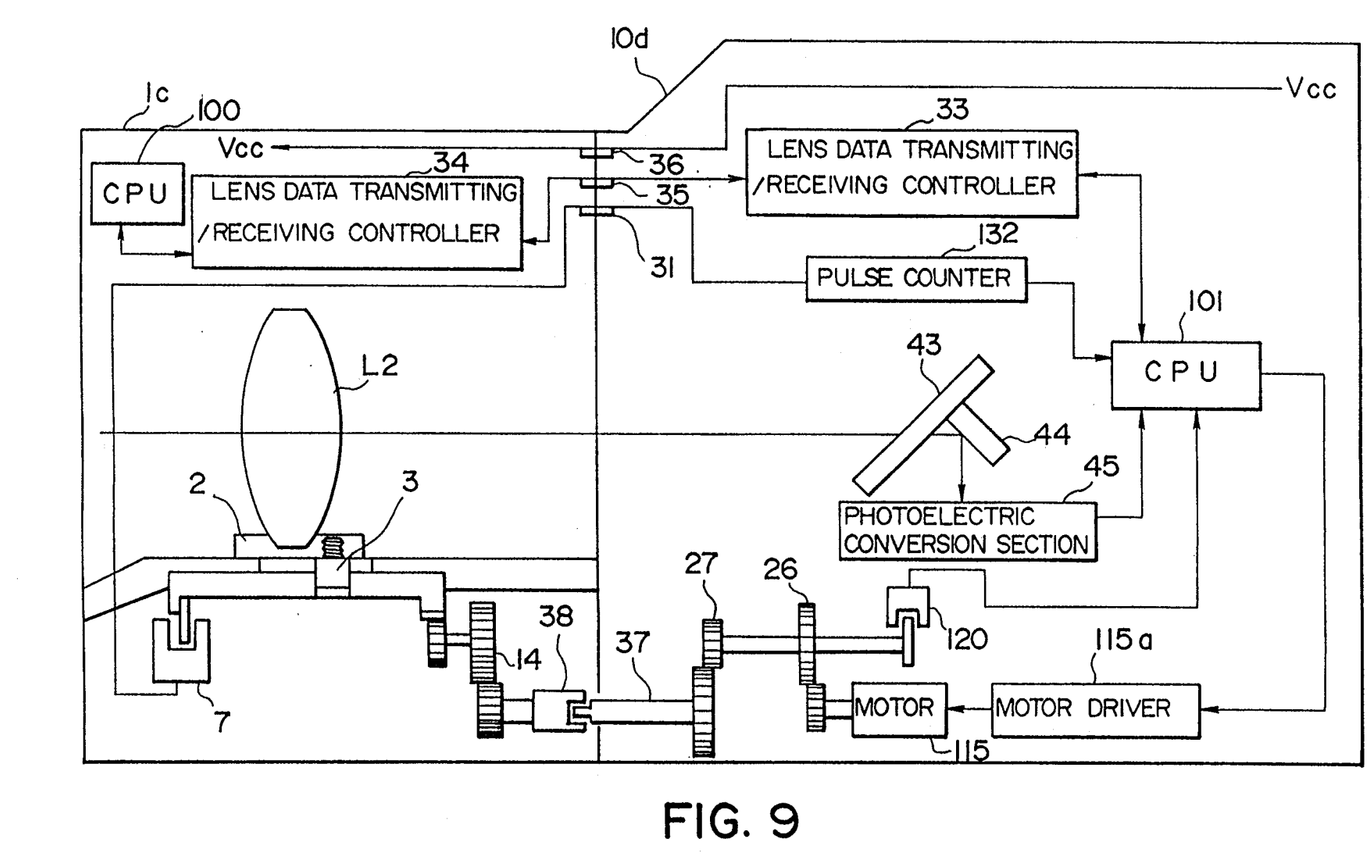
FIG. 9 is a schematic block diagram showing a forth embodiment of the camera system.

Subsequently, a camera system according to a fourth embodiment will be described.

FIG. 9 illustrates the fundamental structure of an automatic focusing camera system according to the fourth embodiment.

What differs in the present embodiment from the third embodiment is that a photointerrupter 120 is provided in the vicinity of a motor shaft. The motor 15 and the motor shaft photointerrupter 20 provided for the second embodiment are now transferred from the inside of the photographing lens to the inside of the camera body.

Therefore, even when the motor 115 is in the camera body 10d, it is possible to perform an accurate positioning of the focusing optical system L2 as well as an accurate velocity control of the motor 115. In this case, it is unnecessary to provide a motor 15 and motor shaft photointerrupter 20 for everyone of the photographing lenses, enabling the exchangeable lens to be manufactured at a lower cost.

In this respect, the description has been made of a camera system wherein the photographing lens is detachably mounted to the camera body, but the present invention is also applicable to a camera system of a lens shutter type.

Figure 10:
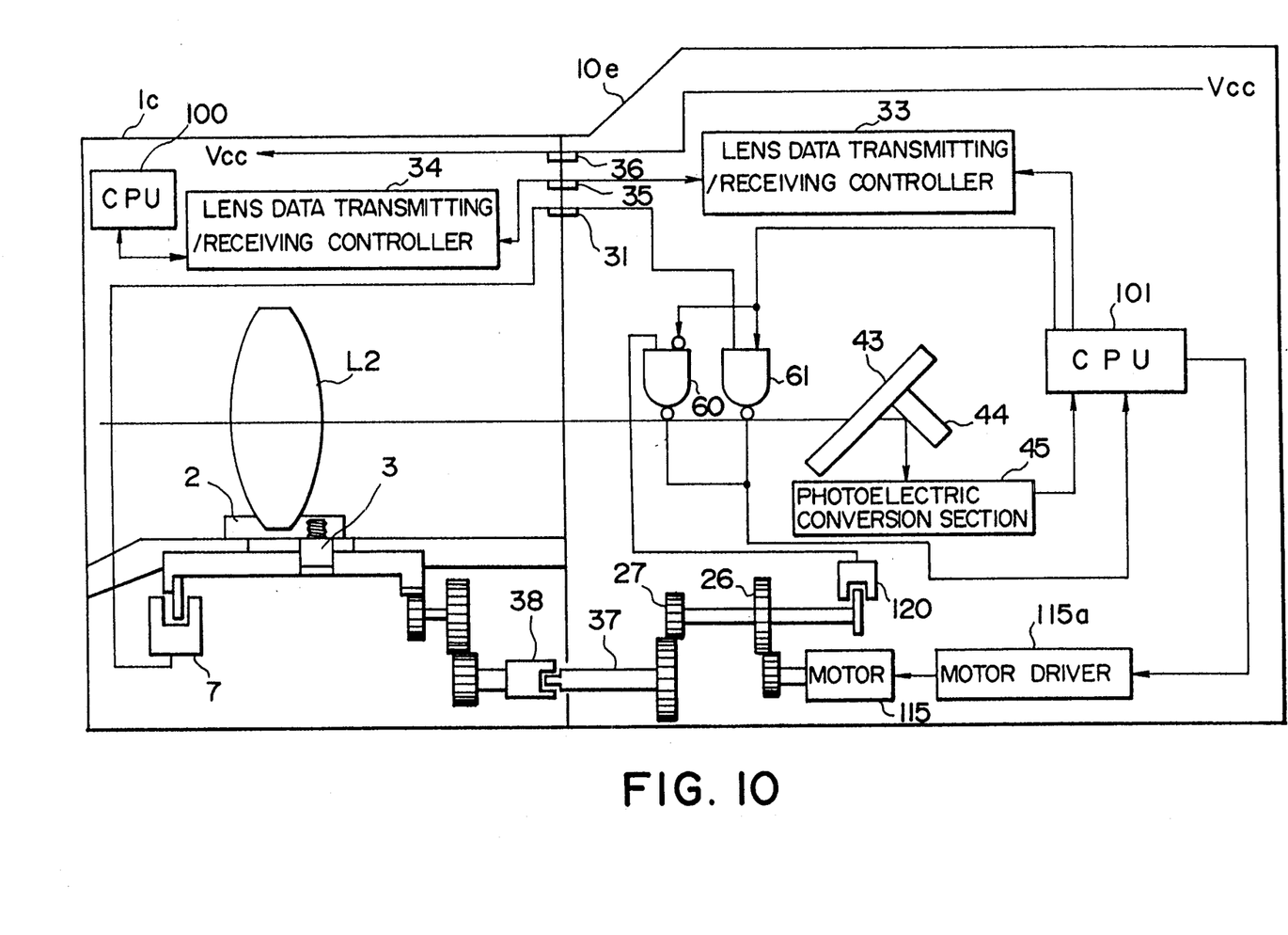
FIG. 10 is a schematic block diagram showing a fifth embodiment of the camera system.

Now, FIG. 10 is a schematic view showing an automatic focusing camera system according to a fifth embodiment of the present invention. The body 10e of the camera shown in FIG. 10 is structured to be able to select the use of monitoring methods for the driving amount of the lens optical system in accordance with the kinds of the lenses to be mounted. In other words, the body 10e of the camera shown in FIG. 10 is provided with a selection circuit having NAND gates 60 and 61 capable of executing wired OR, which is added to the structure of the body 10d shown in FIG. 9.

In a case where the lens 1c in which a photointerrupter for monitoring driving amounts is incorporated is mounted to a camera body 10e such as this, the CPU 101 recognizes that the lens has aforesaid photointerrupter 7 therein on the basis of the lens data per se which is being transmitted from the lens side, and causes the output connected to the NAND gates 60 and 61 to be at a high level, so that the output of the NAND gate 61, i.e., the pulse signal from the photointerrupter 7 in the lens side, is applied to a pulse counter in the CPU 101. In this case, the output from the NAND gate 60 is blocked. As a result, monitor pulses being transmitted from the photointerrupter 7 in the lens 1c side are inputted into the CPU 101 to allow the focusing performance to be carried out in the same manner as in the case shown in the aforesaid FIG. 9.

On the other hand, in a case where the lens without a photointerrupter incorporated is mounted, the CPU 101 recognizes by the communication with the lens that there is no photointerrupter 7 incorporated in the lens side to cause the output connected to the NAND gates 60 and 61 to be at a low level. Thus, the monitor pulses of the photointerrupter 120 in the body side are inputted into the pulse counter in the CPU 101 through the NAND gate 60. The output from the NAND gate 61 is blocked. Consequently, in this case, the monitoring pulses of the driving amount of the motor 115 detected by the photointerrupter 120 in the body side are counted by the pulse counter, and on the basis of the counted value, the focusing is performed. Therefore, the camera body 10e shown in FIG. 10 is capable of performing an automatic focusing appropriately irrespective of the types of the lenses mounted thereto.

Figures 11A, 11B:
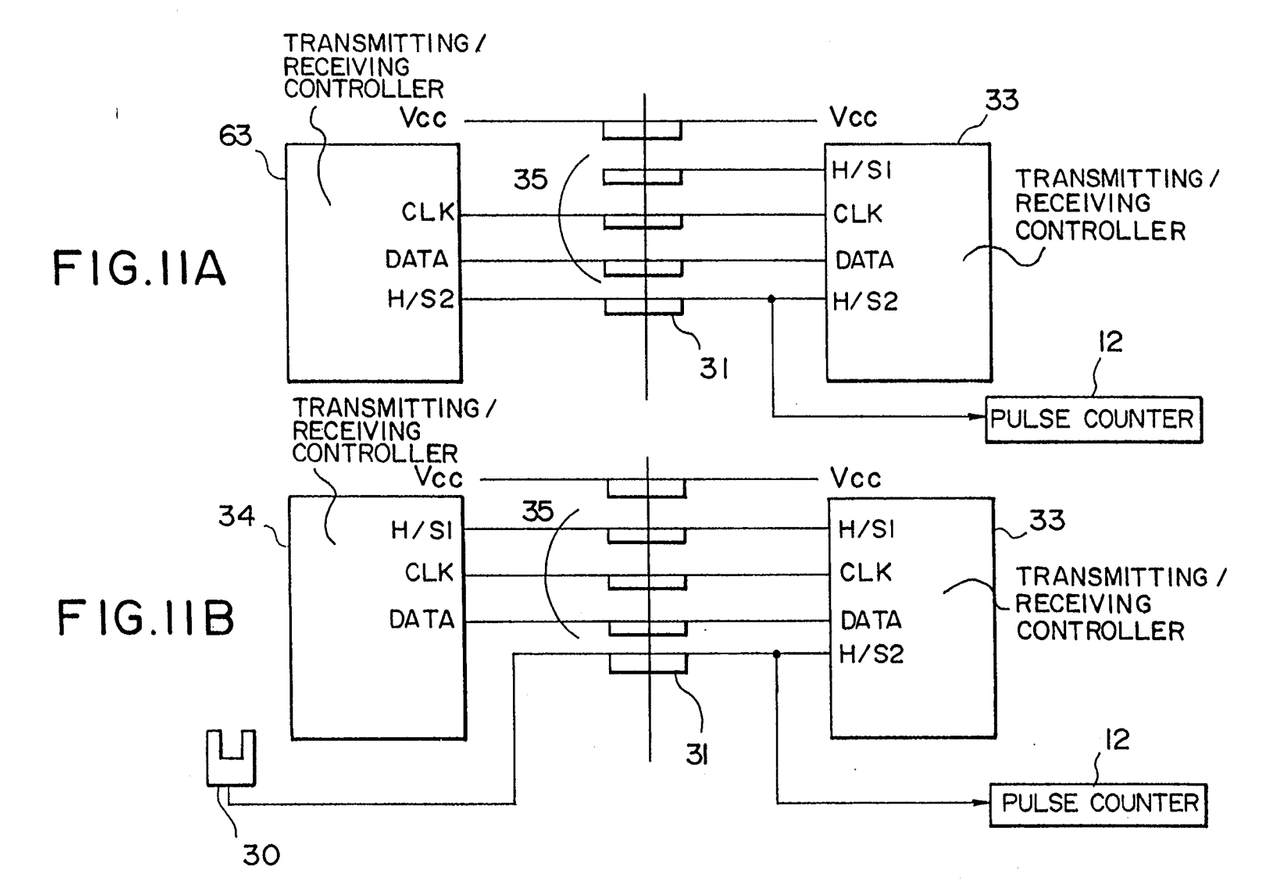
FIGS. 11A and 11B are block diagrams showing the electrical contact connecting the lens and camera body.

Now, in a camera such as shown in FIG. 7 through FIG. 10, a contacting pin is provided as a lens contact in the vicinity of the lens mount for performing the transmitting/receiving of electric signals between the camera body and lens. However, as the number of the contacting pins is limited, it may be possible to consider combining the uses of one contacting pin and another. FIGS. 11A and 11B show how a contacting pin for communicating the handshake signal line H/S2 of a teleconverter lens, (having a transmitting/receiving controller 63) for example, may be used also as the contacting pin for communicating a hand-shake signal or the output signals of a photointerrupter provided in the lens side.

FIG. 11A illustrates the connection of the lens contact when a teleconverter lens is mounted, for example, and there is no circuit provided in the teleconverter side for receiving/transmitting the handshake signal H/S1, but there is a transmitting/receiving circuit for another handshake signal H/S2. A teleconverter lens such as this does not have any photointerrupter. Accordingly, the contact 31 is dedicated for the use of transmitting/receiving the handshake signal H/S2 for the communication between the teleconverter and body.

FIG. 11B, on the contrary, illustrates a case where a lens having a photointerrupter 30 in the lens side is mounted. In this case, the contact 31 is used only for transmitting the output signals of the photointerrupter 30 in the lens side to a pulse counter 12 in the camera body. The handshake signal H/S2 is not used because the signal line for the H/S1 is used for the handshake signal needed for the communication between the lens side and body side.

In this way, using another contact pin also as the contacting pin for transmitting the signals from the photointerrupter in the lens side in a camera according to the present invention, it is possible to implement a camera capable of performing a highly precise focusing without providing any special contact pin for the purpose.

What is claimed is:

1. An automatic focusing camera system provided with a lens barrel in which a focusing optical system is incorporated, and a camera body to which said lens barrel is detachably mounted, comprising:
   a focus detecting device incorporated in said camera body, said focus detecting device detecting the focusing condition of an objective image to output a focus detecting signal;
   a processor incorporated in said camera body, said processor calculating driving information of said focusing optical system on the basis of said focus detecting signal;
   a driving device incorporated in said camera body, said driving device having a driving power source and a first transmission member for transmitting the driving power of said driving power source to said focusing optical system;
   a first signal generator incorporated in said lens barrel, said first signal generator being provided at the final stage of a second transmission member coupled to said first transmission member to generate a first driving signal in response to the driving of said focusing optical system;
   a first terminal member provided in said lens barrel, said first terminal member transmitting said first driving signal to said camera body on real time;
   a second terminal member provided in said camera body, said second terminal member receiving said first driving signal on real time;
   a second signal generator incorporated in said camera body, said second signal generator being provided at the initial stage of said first transmission member to generate a second driving signal in response to the driving of said driving power source;
   a switching member incorporated in said camera body, said switching member switching driving signals to either one of said first driving signal or said second driving signal; and
   a driving controller incorporated in said camera body, said driving controller controlling the position of said focusing optical system and the velocity of said driving power source on the basis of said driving signal switched by said switching member and said driving information.

2. A camera body to which a lens barrel having a focusing optical system incorporated therein is detachably mounted, comprising:
   a focus detector, said focus detector detecting the condition of an objective image to output a focus detecting signal;
   a processor, said processor calculating driving information of said focusing optical system on the basis of said focus detecting signal;
   a driving device, said driving device having a driving power source, and a transmission member for transmitting the driving power of said driving power source;
   a terminal member, said terminal member receiving on real time from said lens barrel a first driving signal being generated in response to the driving of said focusing optical system;
   a signal generator, said signal generator being provided at the initial stage of said transmission member to generate a second driving signal in response to the driving of said driving power source;
   a switching member, said switching member switching driving signals to either one of said first driving signal or said second driving signal; and
   a driving controller, said driving controller controlling the position of said focusing optical system and the velocity of said driving power source on the basis of said driving signal switched by said switching member and said driving information.

3. A camera body according to claim 2, wherein a conversion lens barrel in which a focusing optical system is incorporated is further detachably mountable, and when said conversion lens barrel is mounted, said terminal member is not allowed to receive said first driving signal but to transmit to or receive from the conversion lens barrel information of said conversion lens barrel; and said driving controller controls the velocity of said driving power source and the position of the focusing optical system incorporated in said conversion lens barrel on the basis of said second driving signal.

* * * * *